Nov. 26, 1957     A. ARATO     2,814,205
VARIABLE SPEED TRANSMISSION
Filed April 17, 1956     2 Sheets-Sheet 1

INVENTOR.
ACHILLE ARATO
BY
ATTORNEY

Nov. 26, 1957 — A. ARATO — 2,814,205
VARIABLE SPEED TRANSMISSION
Filed April 17, 1956 — 2 Sheets-Sheet 2
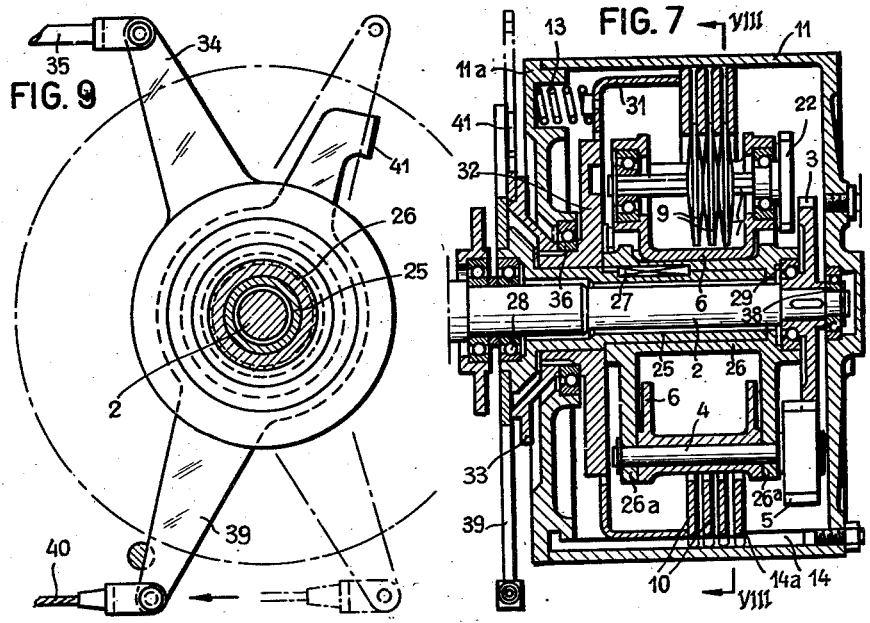
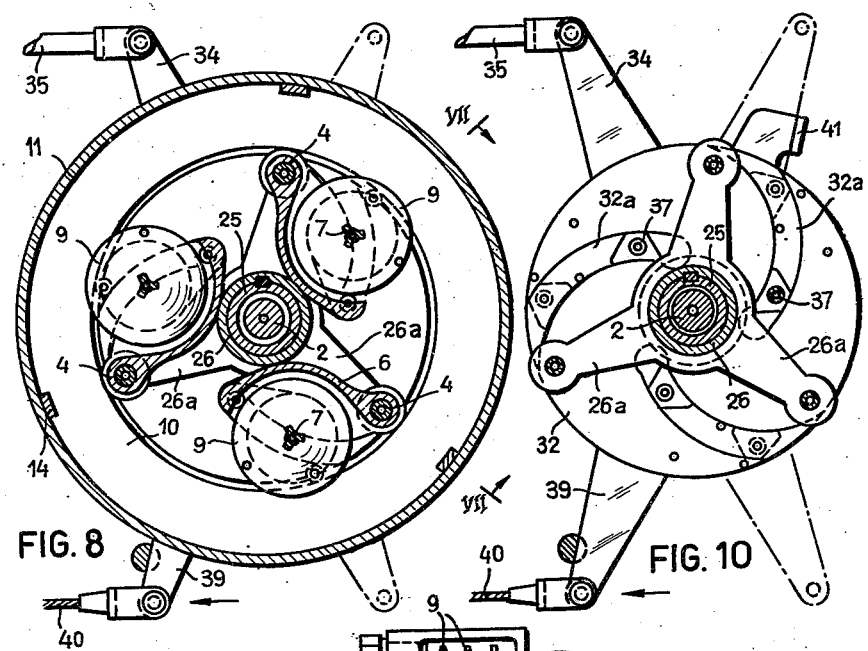
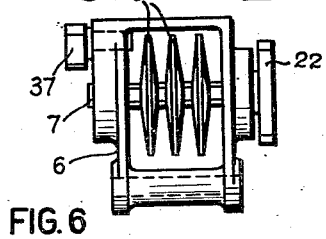
INVENTOR.
ACHILLE ARATO
BY
ATTORNEY United States Patent Office 2,814,205
Patented Nov. 26, 1957

2,814,205

VARIABLE SPEED TRANSMISSION

Achille Arato, Turin, Italy

Application April 17, 1956, Serial No. 578,750

Claims priority, application Italy April 19, 1955

6 Claims. (Cl. 74—199)

This invention relates to a steplessly variable speed transmission gear of the type in which the movement is transmitted from a driving shaft to a driven member by means of conical discs arranged symmetrically about said driving shaft and clamped laterally by flat rings concentric with said shaft and supported by said driven member, said discs receiving rotary movement from said driving shaft, means being provided for varying simultaneously and synchronously the distance of said discs with respect to said driven shaft.

It is one object of the invention to provide a variable speed transmission gear of the character described which is of compact structure, and may be easily mounted on motors of any kind and controlled.

It is another object of the invention to provide a variable speed transmission gear of a structure securing a good cooling and proper lubrication of its mechanisms upon operation.

It is a further object of the invention to provide a variable speed transmission gear of the character described provided with means for automatic adjustment of the resisting torque in accordance with variations in the transmission ratio.

Figure 2:
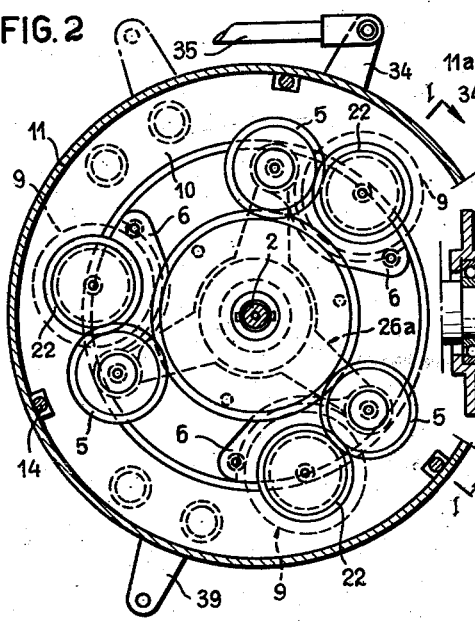
Figure 1:
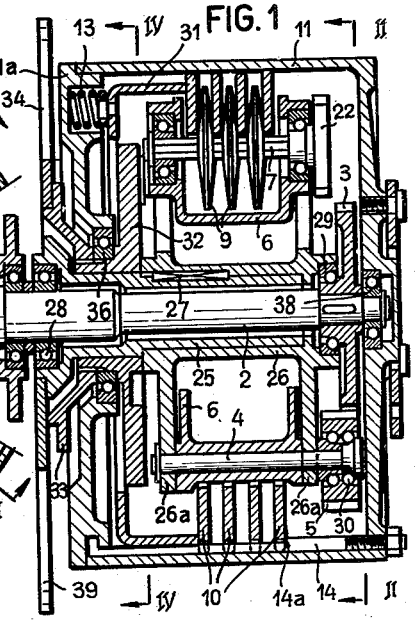
Figure 4:
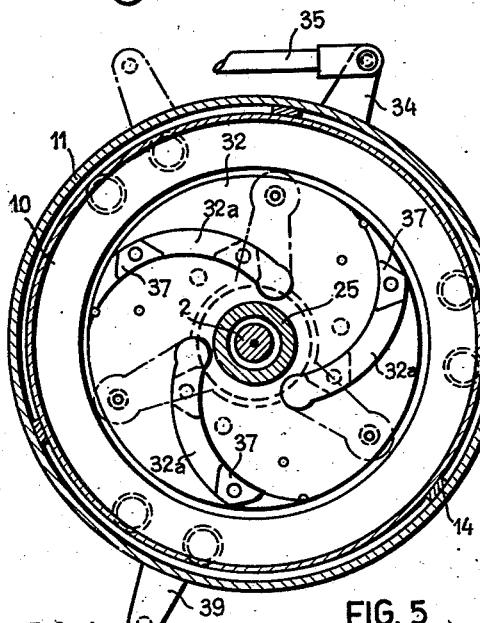
Figure 5:
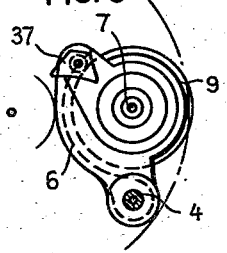
Figure 3:
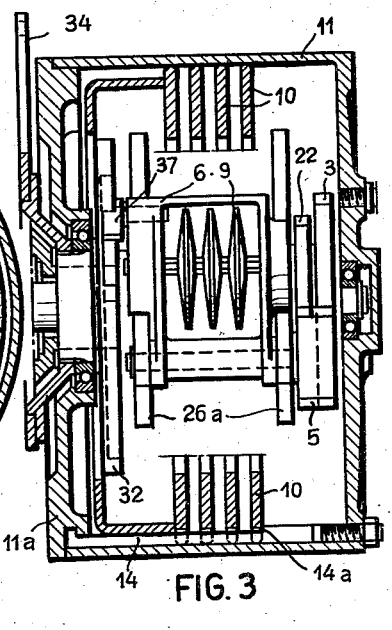

With this and other objects in view the invention will now be described with reference to the accompanying drawings in which:

Figure 1 is a longitudinal sectional view on line I—I of Figure 2, of a first embodiment of the variable speed transmission according to this invention, Figure 2 is a cross sectional view of the variable speed transmission on line II—II of Figure 1, Figure 3 is a part longitudinal sectional view of the variable speed transmission, Figure 4 is a sectional view on line IV—IV of Figure 1, Figures 5 and 6 are side views of other structural details of the device shown in Figures 1 to 4, Figure 7 is a sectional view on line VII—VII of Figure 8 showing a variable speed transmission provided with means for automatic adjustment of the transmission ratio in accordance with the resisting torque, Figure 8 is a sectional view on line VIII—VIII of Figure 7 and Figures 9 and 10 are side views of structural details of the modification shown in Figures 7 and 8.

Referring to Figures 1 to 6 a central support is mounted on the driving shaft 2 and is made up of two halves 25, 26 joined by a cotter 27. The central support is guided about the shaft 2 by means of two antifriction bearings 28, 29 arranged in proximity to the motor and the end of the shaft 2, respectively. The element 26 is provided with three pairs of spikes 26a carrying the spindles 4 and angularly spaced and parallel with the shaft 2. Supports 6 are mounted for oscillation on the spindles 4 and each carries a freely rotatable splined shaft 7 having keyed thereto for axial displacement conical discs 9 adapted to transmit motion to a set of annular discs 10 fast with a drum 11 enclosing the variable speed transmission and constituting its driven shaft coupled to the utilising apparatus.

The central support 25—26 is held stationary by an arm 39 connected to the element 25 and secured to a stationary part, such as the casing or crankcase.

A pinion is loosely mounted for rotation on balls 30 at the end of each spindle 4. The pinions 5 mesh with the main toothed wheel 3 keyed to the driving shaft and transmit motion to cooperating pinions 22 keyed to associated splined shafts 7, hence fast with the conical discs 9.

A disc 32 is mounted on the portion of the element 25 adjacent the motor and is formed with three spiral grooves 32a engaging shoes 37 secured to each of the oscillating supports 6, respectively. The hub of the disc 32 is connected to a disc 33 arranged externally of the cover 11a on the drum and fast with an arm 34 connected to a pull-rod 35 adapted to transmit the hand control for the purpose of varying the spacing of the spindles 4 from the shaft 2, hence the transmission ratio. An antifriction bearing 36 is mounted on the disc 32 and has its inner race ring enclosed by the drum cover 11a. A further antifriction bearing 38 is mounted about the end of the driving shaft 2 and guides the bottom of the drum 11 which is thereby conveniently supported at both ends.

Three helical springs 13 are seated in the cover 11a on the drum and act on a cup 31 pressing the last disc of the discs 10, affording a constant contact between said discs and conical rollers 9 through the pressure of the springs 13.

Variation in the transmission ratio is effected by acting on the pull-rod 35 and rocking the arm 34 together with the disc 32 in which the spiral grooves 32a are cut. This rotation causes the shoes to move along the spiral grooves 32, thereby rocking the supports 6 about the pivots 4 on the stationary central support. This oscillation results in displacement of the conical discs 9 with respect to the annular discs 10, whereby transmission of motion takes place along circumferences of different radii and the transmission ratio is varied.

Figures 1 and 7 show the variable speed transmission in its minimum and maximum speed position, respectively.

Both the oscillating supports 6 for the conical discs 9 and the drum 11 are conveniently mounted, as they are guided at their ends through antifriction bearings on the driving shaft; the control members for varying the transmission ratio are likewise advantageously mounted, as they are arranged in proximity to the engine, while the transmission gearing is on the opposite side of the support.

In the embodiment shown in Figures 7 to 10 the variable speed transmission is provided with means for automatic adjustment of the resisting torque in accordance with variations in the transmission ratio. For this purpose, instead of being anchored to a stationary part the arm 39 is connected by a cable 40 and resilient members, not shown on the drawing, to the member submitted to the resisting torque so that on variation of the resisting torque the angular position of arm 39 is varied, thereby automatically angularly displacing the stationary central support 25—26 and disc 32 the angular position of which is unaltered. This angular displacement results in a variation in spacing of the conical discs from the motor shaft, hence in a variation in transmission ratio in agreement with the variation in the resisting torque.

The lever 39 is provided with an extension 41 cooperating with the arm 34 for the purpose of limiting its angular displacement.

What I claim is:

1. In a steplessly variable speed transmission gear, a driving shaft, a tubular support rotatably mounted on said driving shaft, at least a pair of radially extending parallel arms fast with said support, said arms being spaced therebetween in the direction of the axis of the driving shaft, an intermediate shaft parallel to said driving shaft and radially spaced therefrom supported by said arms and having at least one of its ends extending beyond one of said arms, a tubular member rotatably mounted on said intermediate shaft and arranged between said arms a fork-shaped extension on said tubular member, an intermediate gear mounted rotatably on one end of said intermediate shaft projecting beyond one of said arms, a gear keyed on said driving shaft and meshing with said intermediate gear, a splined secondary driving shaft rotatably supported by said fork-shaped extension parallel with said driving shaft and having at least one of its ends extending beyond said fork shaped extension, a secondary gear fast with said end of said secondary splined shaft and meshing with said intermediate gear, a set of conical equal discs mounted on said secondary driving shaft and axially slidable thereon, a drum open at its one end rotatably supported by said driving shaft and surrounding with its lateral wall said discs, flat rings inside said drum axially slidable but not rotatable with respect to said drum, said rings contacting with said discs and being in such a number that each disc is inserted between two successive rings, stop means for preventing the displacement of said rings towards the closed end of the drum, spring means urging said rings and said discs against each other, a disc rotatably mounted on said tubular support and adjacent said fork shaped extension on said tubular member mounted on said intermediate said shaft, a spiral groove provided on the side of said disc facing said fork shaped extension, a shoe fast with said extension and engaging said groove, a lever fast with said disc for varying the angular position of the later with respect of said tubular support rotatably mounted on said driving shaft, and a lever secured to said tubular support for holding it steady in a desired poistion upon operation of the device.

2. In a steplessly variable speed transmission gear a driving shaft, a tubular support rotatably mounted on said driving shaft, at least one radially extending arm fast with said support, an intermediate rocking support mounted on said arm rotatable about an axis parallel to that of said driving shaft, an intermediate gear mounted rotatably on said rocking support and coaxial with the axis of rotation of the latter, a gear keyed on said driving shaft and meshing with said driving shaft, an extension on said rocking support, a splined secondary driving shaft rotatably mounted on said extension and parallel to said driving shaft, a secondary gear fast with said splined shaft and meshing with said intermediate gear, a set of conical equal discs mounted on said splined shaft and axially slidable thereon, a cylindrical drum open at its one end and closed at its other end rotatably supported on said driving shaft and surrounding with its lateral wall said discs, flat rings inside said drum arranged near its lateral wall and radially extending towards its axis and engaging said discs, said rings being in such a number that each disc is inserted between two successive rings, stop means within said drum for preventing the displacement of said rings towards the closed end of said drum, spring means for pressing together said rings against said discs, a disc rotatably mounted on said tubular support and adjacent said rocking support, a spiral groove provided on the side of said disc facing said rocking support, a shoe fast with said rocking support and engaging said groove, a lever fast with said disc for varying the angular position of the latter with respect to said tubular support, and a lever secured to said tubular support for holding the latter steady in a desired position upon operation of the device.

3. In a steplessly variable speed transmission gear a driving shaft connected at its one end to a motor, a cylindrical drum surrounding said driving shaft, a bottom in said drum adjacent the free end of said shaft and tightly closing the drum, said drum being coaxial with said shaft and being rotatably supported on the free end of the latter, a transmission gear adjacent said bottom keyed to said driving shaft and situated within said drum, a tubular support rotatably mounted on said shaft and adjacent said transmission gear, three pairs of radially extending parallel arms fast with said support, the arms of each pair being spaced therebetween in the direction of the axis of the driving shaft, an intermediate shaft parallel to said driving shaft and radially spaced therefrom supported by each of said pairs of arms and having at least one of its ends extending beyond that of said arms which is nearer to the drum bottom, a tubular member rotatably mounted on each of said intermediate shafts and arranged between said arms, a fork-shaped extension on said tubular member, an intermediate gear rotatably mounted on said end of each intermediate shaft and meshing with said transmission gear, a splined secondary driving shaft rotatably supported by said fork-shaped extension, parallel with the driving shaft and having its one end projecting beyond said fork-shaped extension towards the drum bottom, a secondary gear fast with said end of said splined shaft and meshing with said intermediate gear, a set of equal conical discs mounted on said secondary driving shaft and axially slidable thereon, flat rings inside said drum concentric therewith arranged adjacent the peripheral wall of the drum and radially extending towards its axis, said disc being axially slidable but not rotatable with respect to said drum and engaging said discs, said rings being in such a number that each disc is inserted between two successive rings, stop means in said drum for preventing the displacement of that of said rings which is the nearest to the drum bottom towards said bottom, spring means for pressing said rings and said discs against each other, a disc rotatably mounted on said tubular support adjacent said fork-shaped extension, three equal spiral grooves cut in the face of said disc facing said fork-shaped extensions, a shoe fast with each of said fork-shaped extensions engaging one of said grooves, a tubular projection on said disc extending from its face opposite to that facing the drum bottom, an annular cover rotatably mounted on said tubular projection and secured with its outer periphery to the lateral wall of the drum for tightly closing the latter, a lever fast with said tubular projection of the disc for varying the angular position of the latter with respect to said tubular support, the latter extending beyond said tubular projection of the disc, and a lever secured to the tubular support for maintaining the latter steady in a desired position upon operation of the device.

4. In a steplessly variable speed transmission gear, a driving shaft, a tubular support rotatably mounted on said driving shaft, at least a pair of radially extending parallel arms fast with said support, said arms being spaced therebetween in the direction of the axis of the driving shaft, an intermediate shaft parallel to said driving shaft and radially spaced therefrom supported by said arms and having at least one of its ends extending beyond one of said arms, a tubular member rotatably mounted on said intermediate shaft and arranged between said arms, a fork-shaped extension on said tubular member, an intermediate gear mounted rotatably on one end of said intermediate shaft projecting beyond one of said arms, a gear keyed on said driving shaft and meshing with said intermediate gear, a splined secondary driving shaft rotatably supported by said fork-shaped extension parallel with said driving shaft and having at least one of its ends extending beyond said fork shaped extension, a secondary gear fast with said end of said secondary splined shaft and meshing with said intermediate gear, a set of conical equal discs mounted on said secondary driving shaft and axially slidable thereon, a drum open at its one end rotatably supported by said driving shaft and surrounding with its lateral wall said discs, flat rings inside said drum axially slidable but not rotatable with respect to said drum, said rings contacting with said discs and being in such a number that each disc is inserted between two successive rings, stop means for preventing the displacement of said rings towards the closed end of the drum, spring means urging said rings and said discs against each other, a disc rotatably mounted on said tubular support and adjacent said fork shaped extension on said tubular member mounted on said intermediate shaft, a spiral groove provided on the side of said disc facing said fork shaped extension, a shoe fast with said extension and engaging said groove, a lever fast with said disc for varying the angular position of the latter with respect of said tubular support rotatably mounted on said driving shaft, a lever fast with said tubular support, and resilient means interposed between said lever and the resisting torque for automatically varying the transmission ratio.

5. In a steplessly variable speed transmission gear a driving shaft, a tubular support rotatably mounted on said driving shaft, at least one radially extending arm fast with said support, an intermediate rocking support mounted on said arm rotatable about an axis parallel to that of said driving shaft, an intermediate gear mounted rotatably and said rocking support and coaxial with the axis of rotation of the latter, a gear keyed on said driving shaft and meshing with said driving shaft, an extension on said rocking support, a splined secondary driving shaft rotatably mounted on said extension and parallel to said driving shaft, a secondary gear fast with said splined shaft and meshing with said intermediate gear, a set of conical equal discs mounted on said splined shaft and axially slidable therein, a cylindrical drum open at its one end and closed at its other end rotatably supported on said driving shaft and surrounding with its lateral wall said discs, flat rings inside said drum arranged near its lateral wall and radially extending towards its axis and engaging said discs, said rings being in such a number that each disc is inserted between two successive rings, stop means within said drum for preventing the displacement of said rings towards the closed end of said drum, spring means for pressing together said rings against said discs, a disc rotatably mounted on said tabular support and adjacent said rocking support, a spiral groove provided on the side of said disc facing said rocking support, a shoe fast with said rocking support and engaging said groove, a lever fast with said disc for varying the angular position of the latter with respect to said tubular support, a lever fast with said tubular support, and resilient means interposed between said lever and the resisting torque for automatically varying the transmission ratio.

6. In a steplessly variable speed transmission gear a driving shaft connected at its one end to a motor, a cylindrical drum surrounding said driving shaft, a bottom in said drum adjacent the free end of said shaft and tightly closing the drum, said drum being coaxial with said shaft and being rotatably supported on the free end of the latter, a transmission gear adjacent said bottom keyed to said driving shaft and situated within said drum, a tubular support rotatably mounted on said shaft and adjacent said transmission gear, three pairs of radially extending parallel arms fast with said support, the arms of each pair being spaced therebetween in the direction of the axis of the driving shaft, an intermediate shaft parallel to said driving shaft and radially spaced therefrom supported by each of said pairs of arms and having at least one of its ends extending beyond that of said arms which is nearer to the drum bottom, a tubular member rotatably mounted on each of said intermediate shafts and arranged between said arms, a fork-shaped extension on said tubular member, an intermediate gear rotatably mounted on said end of each intermediate shaft and meshing with said transmission gear, a splined secondary driving shaft rotatably supported by said fork-shaped extension, parallel with the driving shaft and having its one end projecting beyond said fork-shaped extension towards the drum bottom, a secondary gear fast with said end of said splined shaft and meshing with said intermediate gear, a set of equal conical discs mounted on said secondary driving shaft and axially slidable thereon, flat rings inside said drum concentric therewith arranged adjacent the peripheral wall of the drum and radially extending towards its axis, said disc being axially slidable but not rotatable with respect to said drum and engaging said discs, said rings being in such a number that each disc is inserted between two successive rings, stop means in said drum for preventing the displacement of that of said rings which is the nearest to the drum bottom towards said bottom, spring means for pressing said rings, and said discs against each other, a disc rotatably mounted on said tubular support adjacent said fork-shaped extension, three equal spiral grooves cut in the face of said disc facing said fork-shaped extensions, a shoe fast with each of said fork-shaped extensions engaging one of said grooves, a tubular projection on said disc extending from its face opposite to that facing the drum bottom, an annular cover rotatably mounted on said tubular projection and secured with its outer periphery to the lateral wall of the drum for tightly closing the latter, a lever fast with said tubular projection of the disc for varying the angular position of the latter with respect to said tubular support, the latter extending beyond said tubular projection of the disc, a lever fast with said tubular support, and resilient means interposed between said lever and the resisting torque for automatically varying the transmission ratio.

References Cited in the file of this patent

UNITED STATES PATENTS

| | | |
|---|---|---|
| 2,216,642 | Davis | Oct. 1, 1940 |
| 2,222,281 | Beier | Nov. 19, 1940 |
| 2,623,396 | Beier | Dec. 30, 1952 |
| 2,727,397 | Jorgensen | Dec. 20, 1955 |

FOREIGN PATENTS

| | | |
|---|---|---|
| 321,661 | France | Jan. 16, 1903 |
| 12,181 | France | May 12, 1910 |
| | (Addition to No. 399,506) | |
| 288,535 | Switzerland | May 16, 1953 |